United States Patent [19]

Lahos

[11] Patent Number: 5,584,561
[45] Date of Patent: Dec. 17, 1996

[54] LIGHTING DEVICE FOR A BICYCLE

[75] Inventor: Etienne Lahos, Saint-Georges Bce, Canada

[73] Assignee: Leader Industries, Inc., Boucherville, Canada

[21] Appl. No.: 355,991

[22] Filed: Dec. 14, 1994

[30] Foreign Application Priority Data

Aug. 25, 1994 [CA] Canada ................................... 2130852

[51] Int. Cl.⁶ ....................................................... B62J 6/00
[52] U.S. Cl. .............................. 362/72; 362/78; 362/192; 340/432; 340/815.64; 310/67 A
[58] Field of Search ................................ 362/72, 78, 192, 362/183; 340/815.64, 815.71, 432, 480; 310/67 A, 171, 67 R, 156, 254, 168, 171

[56] References Cited

U.S. PATENT DOCUMENTS

| | | |
|---|---|---|
| 3,751,710 | 8/1973 | Carmichael et al. |
| 3,792,307 | 2/1974 | Baker. |
| 3,971,977 | 7/1976 | Hirt et al. ............................. 362/72 X |
| 4,019,171 | 4/1977 | Martelet ................................ 362/72 X |
| 4,069,451 | 1/1978 | Rouse. |
| 4,191,988 | 3/1980 | Kumakura. |
| 4,225,848 | 9/1980 | Roberts ................................... 340/432 |
| 4,555,656 | 11/1985 | Ryan. |
| 4,860,176 | 8/1989 | Bauwens et al. ........................ 362/72 |
| 4,974,124 | 11/1990 | Wu ............................................ 362/72 |
| 5,015,918 | 5/1991 | Copeland ............................. 362/72 X |
| 5,121,305 | 6/1992 | Deed et al. |
| 5,128,840 | 7/1992 | Seki et al. .................................. 362/72 |

FOREIGN PATENT DOCUMENTS

| | | |
|---|---|---|
| 2413731 | 7/1979 | France. |
| 3832109 | 3/1990 | Germany. |
| 4029142 | 3/1992 | Germany. |
| 5319333 | 12/1993 | Japan ........................................ 362/72 |
| 681715 | 10/1952 | United Kingdom. |

OTHER PUBLICATIONS

Patent Abstracts of Japan vol. 12, No. 351 (E–660) (3198) 20 Sep. 1988 & JP, A,63 107 446 (Norio Akamatsu) 12 May 1988 see abstract.
Lahos, Lighting Device for a Bicycle, Aug. 1994, whole document.

*Primary Examiner*—Carl D. Price
*Assistant Examiner*—Thomas M. Sember
*Attorney, Agent, or Firm*—Cushman, Darby & Cushman IP Group of Pillsbury, Madison & Sutro LLP

[57] ABSTRACT

The disclosure herein describes a lighting device which is adapted for use with a wheel bicycle and which includes a magnet mounted to one of the wheels and a housing mounted to the bicycle frame. A solenoid inside the housing has a winding and a core closely mounted to the wheel. A lamp is electrically connected to the solenoid winding so that light is emitted as a result of the magnet passing by the solenoid core as the bicycle wheel rotates. The electrical system includes storage elements which accumulate an excess of electrical energy during wheel rotation to thereby allow light to be emitted after the bicycle has come to a stationary position and until the excess has been used up.

21 Claims, 4 Drawing Sheets

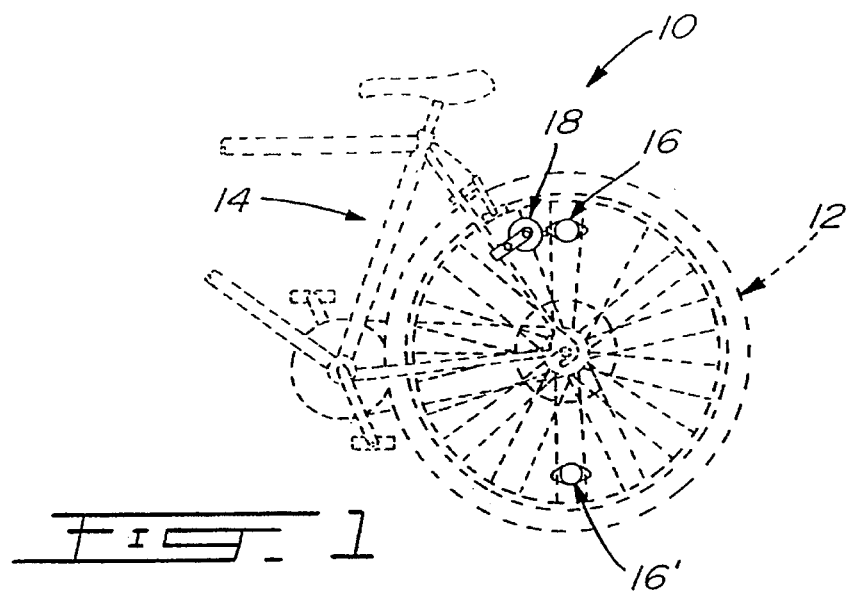
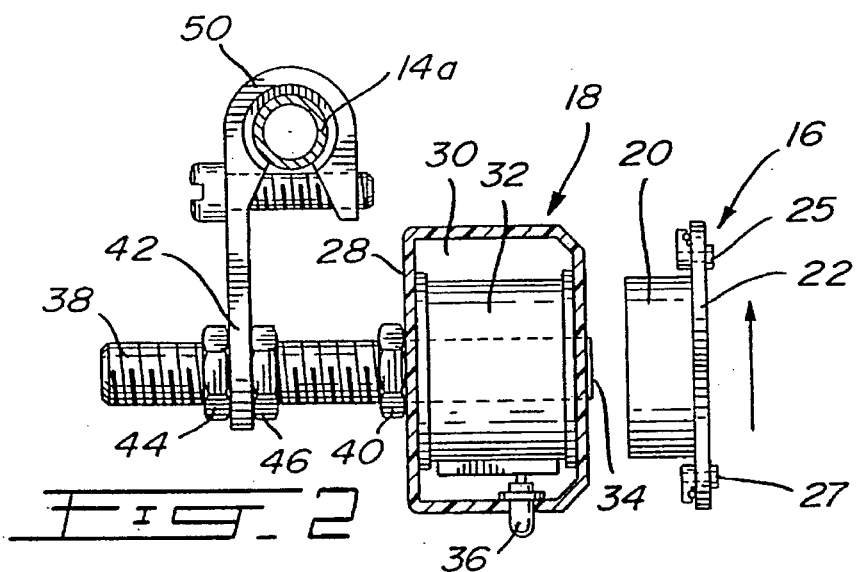
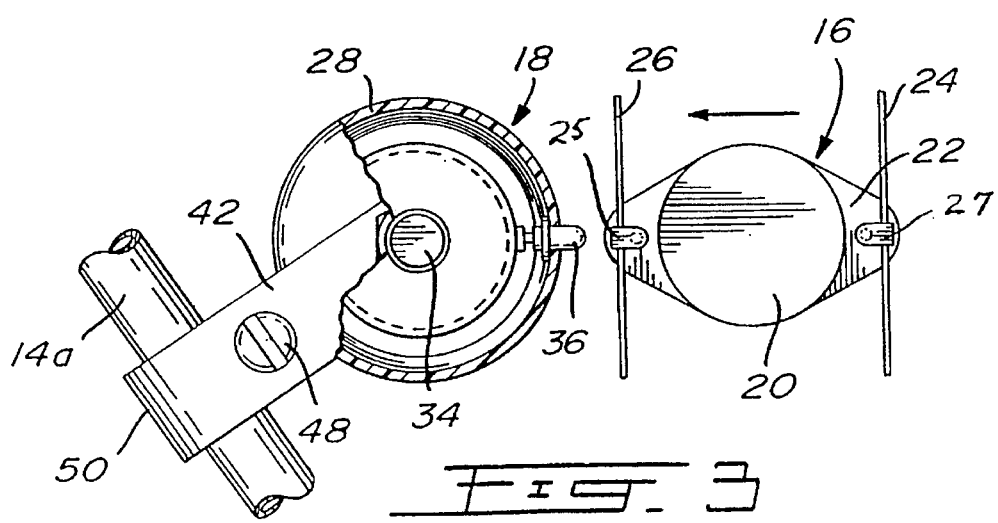

5,584,561

LIGHTING DEVICE FOR A BICYCLE

FIELD OF THE INVENTION

The present invention pertains to a lighting device adapted for use with a wheel bicycle and, more particularly, to a bicycle lighting device which does not require frictional contact with the wheel or use storage batteries.

BACKGROUND OF THE INVENTION

It is known that safety signalling on bicycles is usually accomplished by an electric generator having a part frictionally engaging the side of a wheel whereby the rotational energy thus obtained is converted into electric energy to light a lamp or other lighting device. In other cases, the lamp may be lit by means of an electronic device using batteries (see, for example, U.S. Pat. No. 5,121,305 issued Jun. 9, 1992 to Deed et al.). Such device provides the periodical lighting of an optical radiation element, such as an electroluminescent diode, a filament bulb or a xenon tube. The efficient operation of such safety devices depends on a constant verification of the state of the batteries. Since children are most frequent utilizers of bicycles, it is noted that, often, they neglect to signal the necessity of replacing the batteries, thus resulting in a real danger for their safety. Also to be considered is the expense caused by the repeat acquisition of batteries, which results in a number of users to abandon the use of such devices. Also, some of the substances used in these batteries contain materials dangerous to the environment.

Lighting devices which do not require the use of batteries exist wherein magnets are used for supplying electricity to bulbs (see, for example, U.S. Pat. No. 5,128,840 issued Jun. 7, 1992 to Seki et al. and French patent publication No. 2,413,731 published Jul. 27, 1979 to Kumakura).

Japanese specification 63-107446 (Norio Akamatsu) of May 12, 1988 describes a lamp unit for bicycle wherein a magnet is directly rotated by a wheel and wherein a magneto coil, not in contact with the magnet, induces an electromotive force when the magnet is rotated and passes close to the coil. However, with this device, the lamp unit is only lit when the bicycle wheel rotates (or when the bicycle is used). Hence, when the bicycle is not moving for any reasons, no warning is effected and this may result in serious consequences, especially at night.

OBJECTS AND STATEMENT OF THE INVENTION

It is an object of the present invention to overcome the above problems by providing a device which produces its own energy using the kinetic energy of the bicycle.

It is also an object of the present invention to provide a device which allows the lamp to be lit while the bicycle is in use as well as after it has come to a stop.

The present invention is achieved by using two components, one being fixed while the other is movable. The movement of the latter produces, when in proximity with the fixed element, an electromagnetic field generating an alternating current which is used to illuminate an electroluminescent element.

The present invention also includes means which will allow the storage of electrical energy so that, when the bicycle operator comes to a stationary condition (by reason of traffic lights or of other reasons), the electroluminescent element still flashes until the stored electrical energy is used.

Therefore, the present invention pertains to a lighting device which is adapted for use with a bicycle having a frame and wheels and which comprises:

magnetic field producing means adapted to be mounted on at least one of the wheels;

a housing adapted to be mounted on the frame;

solenoid means mounted in the housing and including a solenoid winding and a solenoid core; one extremity of the core being located closely adjacent to the wheel;

optical radiation means electrically connected to the solenoid winding allowing light to be emitted as a result of the magnetic field producing means passing by the extremity of the core; and storage means for accumulating an excess of electrical energy during rotation of said one of said wheels whereby light may be emitted by the optical radiation means after the wheel has stopped rotating, until the excess has been used up.

In one form of the invention, the optical radiation means consist of one or more light emitting diodes and the magnetic field is produced by one or more magnets mounted on one or more of wheel spokes.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

FIG. 1 is an elevational view of the rear end of a bicycle, shown in dotted lines, illustrating the location of the lighting device used with the present invention;

FIG. 2 is a top view, partly cross-sectional, of the lighting device;

FIG. 3 is an elevational, partly cross-sectional, view thereof;

DESCRIPTION OF PREFERRED EMBODIMENTS

Figure 5:
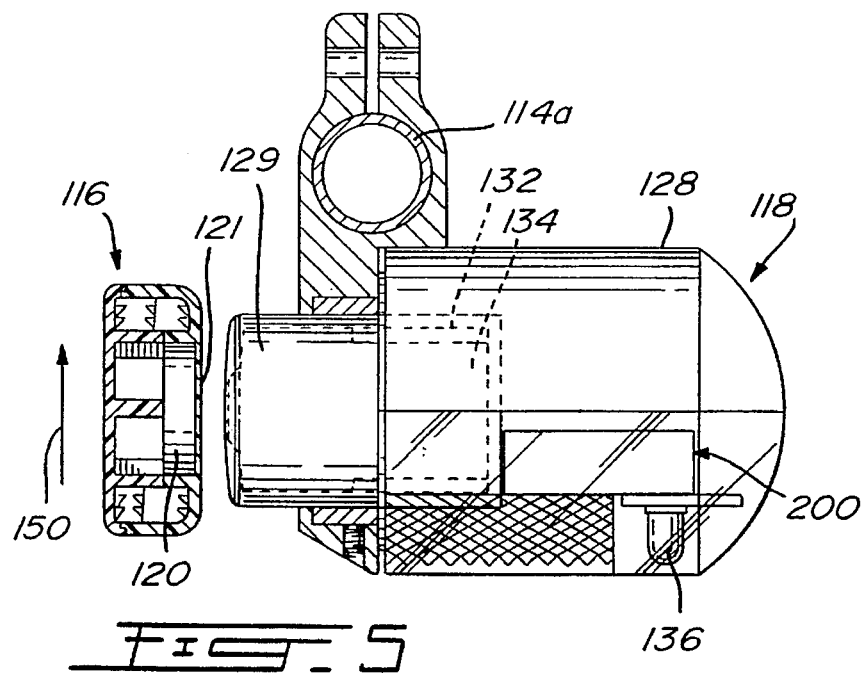
FIG. 5 is a cross-sectional view taken along lines 5—5 of FIG. 4.

FIG. 1 illustrates, in dotted lines, a bicycle 10 with a rear wheel 12 conventionally carried by a frame 14.

The lighting device of the present invention includes two elements 16 and 18, the former being mounted to the wheel, the latter being mounted to the frame of the bicycle.

Referring more particularly to FIGS. 2 and 3, element 16 comprises a magnet 20 mounted to a support 22 fixedly secured to two spokes 24 and 26 of the rear wheel 12 by means of attachments 25 and 27.

Element 18 comprises a housing 28 defining a chamber 30, preferably sealed, into which is mounted a solenoid consisting of a winding 32 and of a ferromagnetic core 34.

Also mounted to the housing 28 is a diode 36 which is electrically connected to the solenoid winding 32.

The housing 28 is mounted to a bolt 38, which may be an extension of the core 34. However, it has a threaded portion so that a nut 40 may secure the housing 28 to the bolt 38.

Also mounted to the bolt 38 is a bracket 42 which is displaceable thereon and may be secured by means of a pair of nuts 44 and 46. One end 50 of bracket 42 is U-shaped so as to be placed on a frame element 14a of the bicycle. A fastening element 48 insures the securement of the bracket end extremity 50 to the frame element 14a.

In operation, as the wheel 12 rotates, the magnet 20 of the element 16 passes by the extremity of the core 34 of the solenoid, thus producing a magnetic field generating a current in the solenoid winding 32 and producing a lighting pulse in the diode 36.

As illustrated in FIG. 1, more than one magnet carrying support may be provided on the spokes of the wheel; for example, a second element 16' may be used as illustrated in a diametrically opposite position to element 16 to provide proper balancing of the wheel. Hence, in this case, two lighting pulses will be made for each rotation of the wheel.

Figure 4:
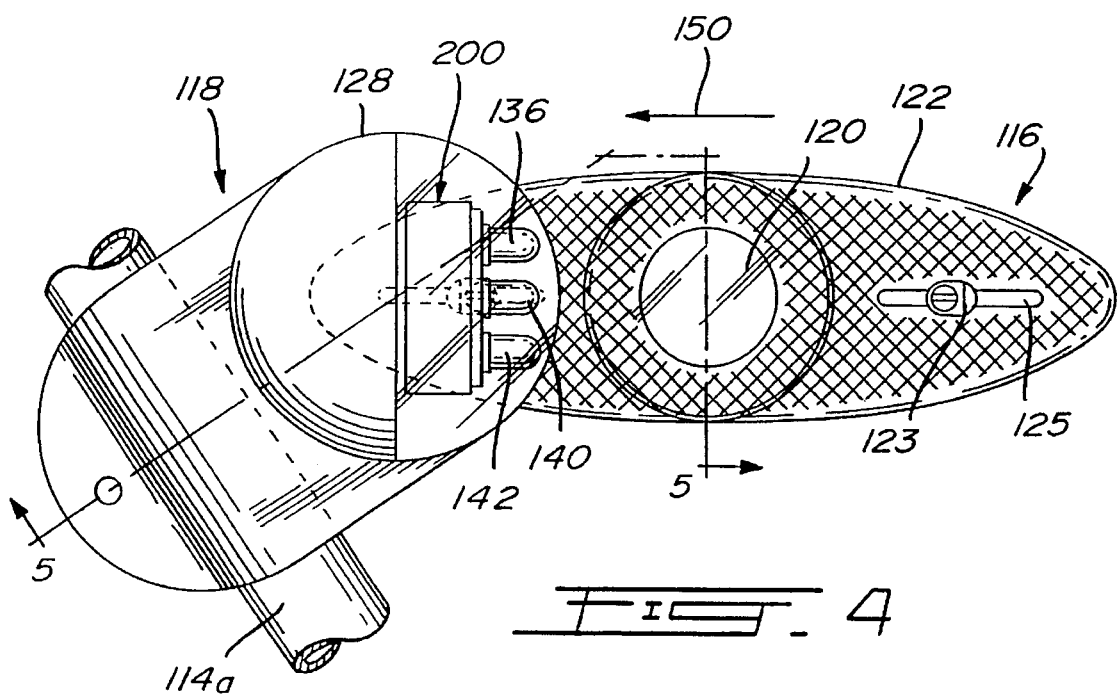
FIG. 4 is an elevational, partly cross-sectional, view of one embodiment of the lighting device made in accordance with the present invention.

Referring to FIGS. 4 and 5, there is illustrated a second embodiment of the present invention consisting of a rotatable element 116 mounted to the spokes of the bicycle wheel and a fixed element 118 mounted to the frame element 114a of a bicycle (not shown).

The rotatable element comprises a magnet 120 mounted to an oval shaped support 122 adapted to be secured to the spokes of the wheel by appropriate fastening elements 123. As can be seen, these fastening elements 123 are mounted into slots 125 to adjust to the various distances separating spokes. In this embodiment, the magnet 120 is protected by a surface layer 121 which still enables the effect of the magnet to be produced.

The fixed element 118 comprises a housing 128 of cylindrical shape supporting a second housing 129 enclosing the solenoid winding 132 and its ferromagnetic core 134.

In this embodiment, there is illustrated a set of three diodes 136, 140 and 142 which are electrically connected to the solenoid winding 132.

In operation, the magnet 120 and its support 122 move in the direction as illustrated by arrow 150 so that as a result of the magnet passing near the core 134 of the solenoid, electronic pulses are generated in the three diodes 136, 140 and 142. Hence, the kinetic energy of the wheel is used to generate the electrical energy for lighting.

Figure 6:
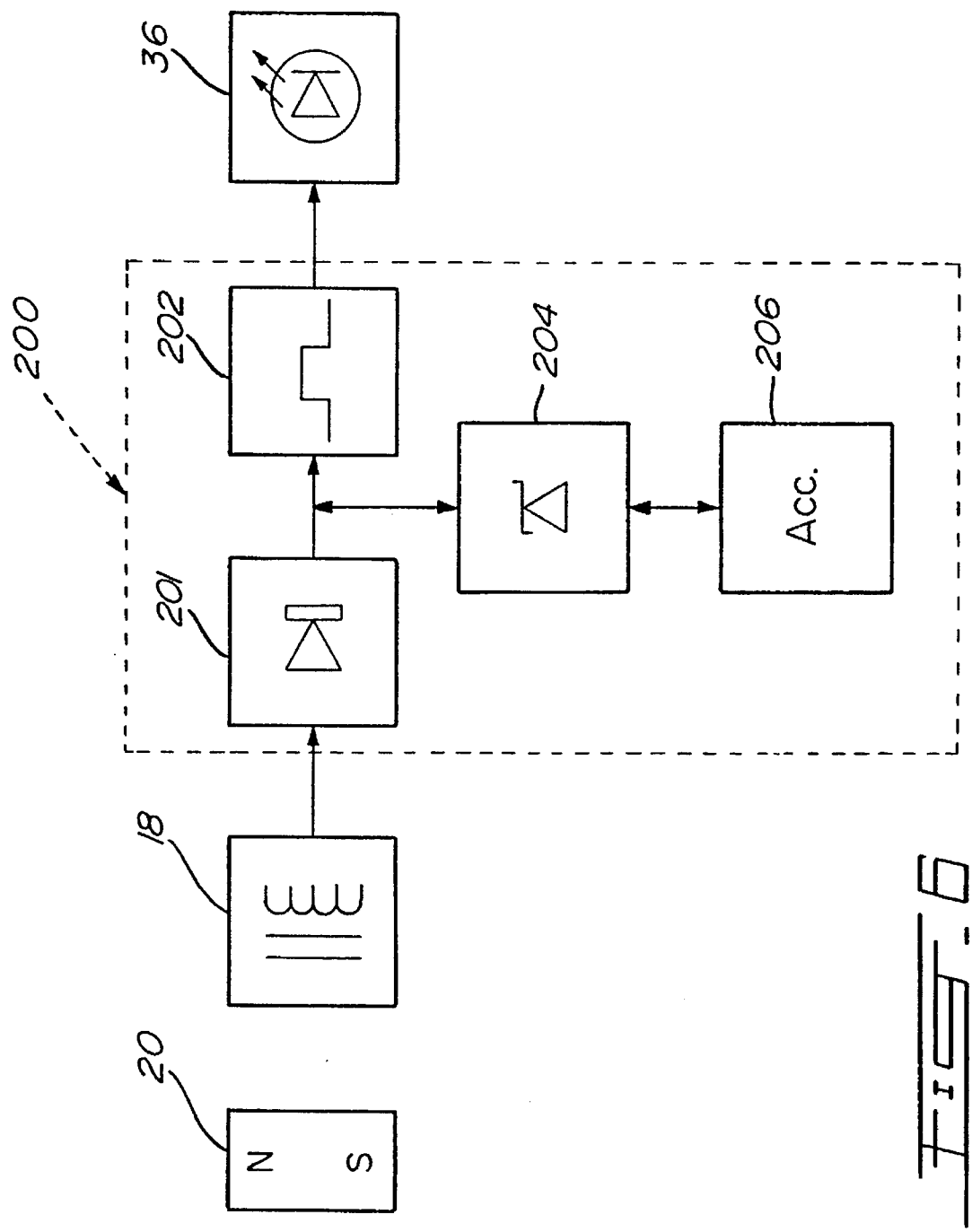
FIG. 6 is a block diagram of the electrical function.

FIG. 6 shows the magnet 20 (which is fixed to the wheel) in the proximity of the coil or solenoid element 18. The alternating current produced by the magnet passage near the coil is fed to an electronic circuitry 200 that includes a diode bridge 201 which rectifies the signal which is then fed to an electronic signalling device 202 that produces electronic pulses to the electroluminescent diode 36. This signalling may be intermittent or continuous and can be displayed at the front or rear of the vehicle.

The electronic circuitry 200 also includes components which will allow the storage of any excess current produced during wheel rotation. A germanium zener diode 204 allows this excess of the energy produced by the magnet and coil arrangement, which is not utilized by the electronic device 202 and the diode 36 (or diodes 136, 140, 142), to be stored by an energy accumulator 206, for example, a capacitor. When the bicycle wheel stops rotating, the capacitor will discharge through the zener diode 204 (which then operates as an ordinary diode). The current storage is in direct proportion to the electricity produced during rotation of the wheel. The diode bridge 201 blocks the current in the reverse direction, as the capacitor discharges.

Figure 7:
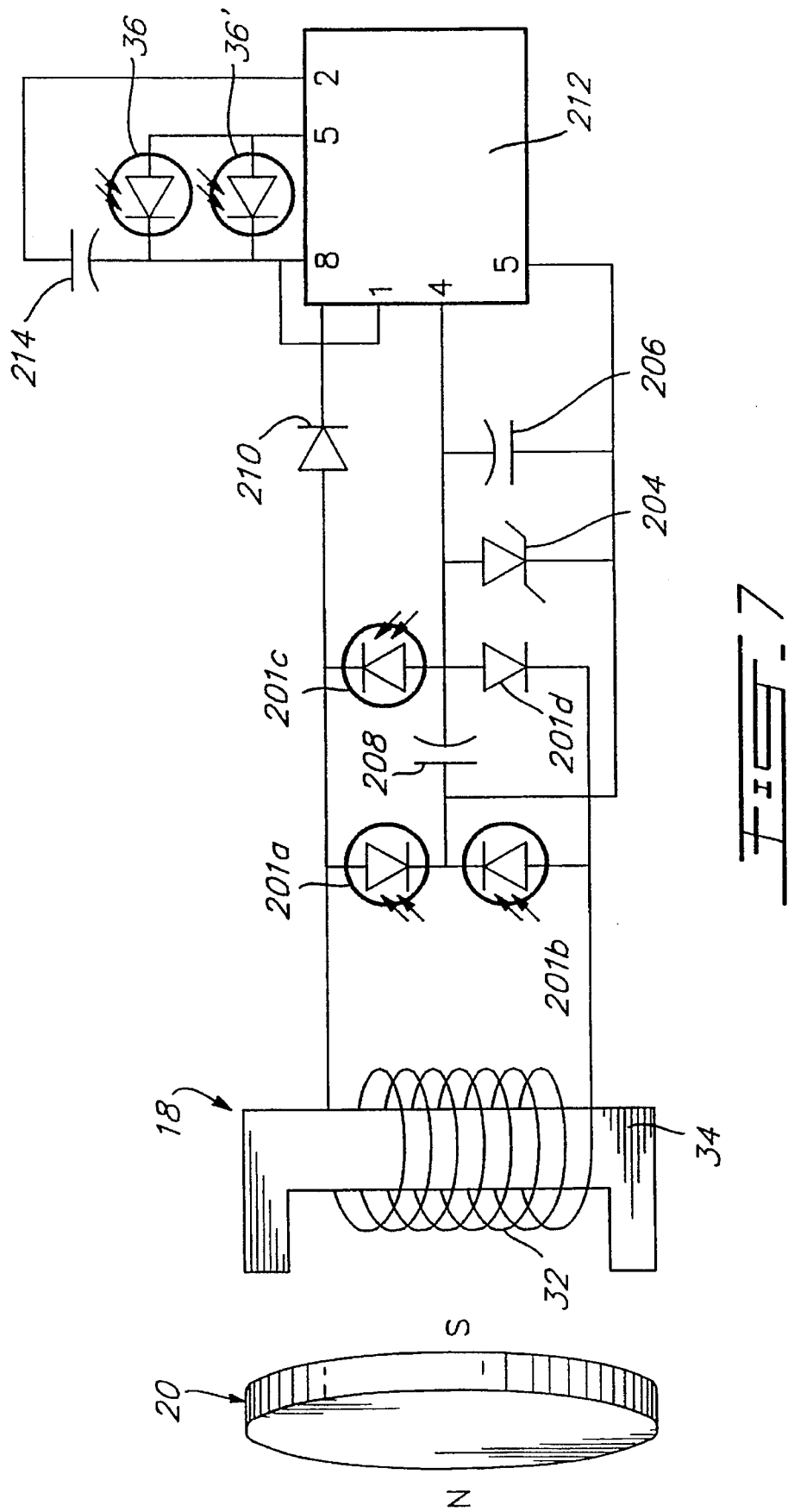
FIG. 7 is an electronic circuit of the lighting device.

FIG. 7 gives a detailed circuitry of the lighting device of the present invention. The magnetic field created by the rotation of the magnet 20 generates an alternating current in the coil 32 which is transformed into a direct current as it passes through the diode bridge 201 formed of three electroluminescent diodes 201a, 201b, 201c and one regular diode 201d. The direct current is then stored in the electronic reservoir 206. Zener diode 204 serves to protect this capacitor from an overload. Optionally, a capacitor 208 may be also used to complement the capacitor 206, which has a high capacity value, in order to use the maximum electrical energy received from the diode bridge 201. In some cases, capacitor 206 may have a tendency to neglect load peaks.

The electronic device 202 includes diode 210 and chip 212. Diode 210 is used to provide a signal to neutralize the flashing operation of the electronic chip 212 during wheel rotation since the fluctuation of the moving magnet 20 creates its own flashing. The capacitor 214 serves to regulate the signal received from the diode 210 which emits a pulsating signal. As long as this signal is generated, capacitor 214 remains charged and prevents the electronic chip 212 from operating during wheel rotation. When the wheel is stopped from turning, there is no signal received in diode 210; hence, chip 212 allows the diodes 36, 36' to flash.

Although the invention has been described above with respect with one specific form, it will be evident to a person skilled in the art that it may be modified and refined in various ways. For example, some bicycle wheels do not have spokes, but a circular surface; therefore, the magnet of the present invention could be mounted to such surface. Also, it is evident that the present lighting device could be mounted to the front wheel of a bicycle. Furthermore, a halogen lamp could be used instead of a diode as well other low energy consumption lights. It is therefore wished to have it understood that the present invention should not be limited in scope, except by the terms of the following claims.

I claim:

1. In combination, a bicycle comprising a frame and wheels mounted on said frame; and a lighting device mounted on said vehicle, said lighting device comprising:

means for providing a magnetic field mounted on one of said wheels;

a solenoid assembly provided on said frame, said means for providing a magnetic field and said solenoid assembly being mounted relative to one another such that said means for providing a magnetic field passes adjacent to said solenoid assembly during rotation of said one wheel, said solenoid assembly being constructed and arranged to generate electrical energy in response to said means for providing a magnetic field passing adjacent thereto;

a light emitting device electrically connected to said solenoid assembly; and means for storing electrical energy generated by said solenoid assembly in excess of that used to power said light emitting device such that said light emitting device remains powered when said one wheel is not in rotation.

2. The combination as defined in claim 1, wherein said solenoid assembly comprises a core and a winding wound about said core.

3. The combination as defined in claim 1, wherein said means for storing comprises a capacitor electrically connected to said solenoid assembly.

4. The combination as defined in claim 3, wherein said means for storing further comprises a zener diode provided between said capacitor and said solenoid assembly.

5. The combination as defined in claim 1, further comprising a diode bridge constructed and arranged to block electrical energy from said solenoid means while stored electrical energy is fed from said means for storing to said light emitting device.

6. The combination as defined in claim 1, further comprising an electronic signalling device provided between said light emitting device and said means for storing.

7. The combination as defined in claim 1, wherein said light emitting device comprises at least one light emitting diode.

8. The combination as defined in claim 1, wherein said light emitting device comprises a lamp.

9. The combination as defined in claim 1, wherein said means for providing a magnetic field comprises a magnet.

10. The combination as defined in claim 9, wherein said magnet is provided with means for mounting said magnet to said one wheel.

11. The combination as defined in claim 1, wherein said means for providing a magnetic field comprises two magnets mounted in diametrically opposition on said one wheel.

12. A lighting device as defined in claim 10, wherein said storage device includes a capacitor and means for allowing said excess of electrical energy to be received by said capacitor.

13. A lighting device as defined in claim 12, wherein said allowing means consists of a zener diode.

14. A lighting device as defined in claim 12, further comprising a diode bridge constructed and arranged to block electrical energy from said solenoid assembly as stored electrical energy is fed from said storage device to said light emitting device.

15. A lighting device as defined in claim 10, further comprising an electronic signalling device disposed between said light emitting device and said storage device.

16. A lighting device as defined in claim 10, wherein said light emitting device comprises at least one light emitting diode.

17. A lighting device as defined in claim 10, wherein said light emitting device comprises a lamp.

18. A lighting device as defined in claim 10, wherein said magnetic device comprises a magnet.

19. A lighting device as defined in claim 18, said magnetic device comprising two magnets.

20. A lighting device as defined in claim 18, wherein said magnetic device further comprises means for mounting said magnet.

21. A lighting device as defined in claim 1, wherein said solenoid assembly is housed in a housing.

* * * * *